(12) United States Patent
Rittershofer et al.

(10) Patent No.: US 12,733,579 B2
(45) Date of Patent: Sep. 15, 2026

(54) SENSOR ARRANGEMENT FOR A COMBINE HARVESTER

(71) Applicant: DEERE & COMPANY, Moline, IL (US)

(72) Inventors: Martin Rittershofer, Zweibrücken (DE); Marco Broschart, Herschberg (DE); Oliver Dahlhauser, Mauschbach (DE)

(73) Assignee: Deere & Company, Moline, IL (US)

( * ) Notice: Subject to any disclaimer, the term of this patent is extended or adjusted under 35 U.S.C. 154(b) by 472 days.

(21) Appl. No.: 18/200,865

(22) Filed: May 23, 2023

(65) Prior Publication Data

US 2024/0000012 A1 Jan. 4, 2024

(30) Foreign Application Priority Data

Jun. 29, 2022 (DE) ......................... 102022116228.1

(51) Int. Cl.
*A01D 41/127* (2006.01)
*A01F 12/44* (2006.01)
(Continued)

(52) U.S. Cl.
CPC ....... *A01D 41/1277* (2013.01); *A01D 41/127* (2013.01); *A01D 41/1276* (2013.01);
(Continued)

(58) Field of Classification Search
CPC ............ A01D 41/1277; A01D 41/1276; A01D 41/127; A01D 41/1273; A01D 41/1272;
(Continued)

(56) References Cited

U.S. PATENT DOCUMENTS 4,266,878 A 5/1981 Auer
6,579,172 B2 * 6/2003 Lauer .................... A01F 12/448
460/1

(Continued)

FOREIGN PATENT DOCUMENTS

CN 110249780 A * 9/2019 ........... A01D 41/127
CN 110637591 A 1/2020

(Continued)

OTHER PUBLICATIONS

Translation of JP-3932655-B2 (Year: 2007).*
Translation of CN-110249780-A (Year: 2019).*
Translation of WO-2022124173-A1 (Year: 2022).*

*Primary Examiner* — Eman A Alkafawi
*Assistant Examiner* — Hugo Navarro
(74) *Attorney, Agent, or Firm* — Taft Stettinius & Hollister LLP; Stephen F. Rost

(57) ABSTRACT

A sensor arrangement for detecting properties of a mixture including grain and contaminants in a cleaning device of a combine harvester. The sensor arrangement is equipped with a sensor element for providing an output signal in respect of a property, detected by the sensor element, of the mixture adjacent to the sensor element. The sensor element is configured to be brought operationally continuously in succession into different positions in relation to the mixture in order to sense different points of the mixture in the different positions of the sensor element.

14 Claims, 4 Drawing Sheets

Figure 1:
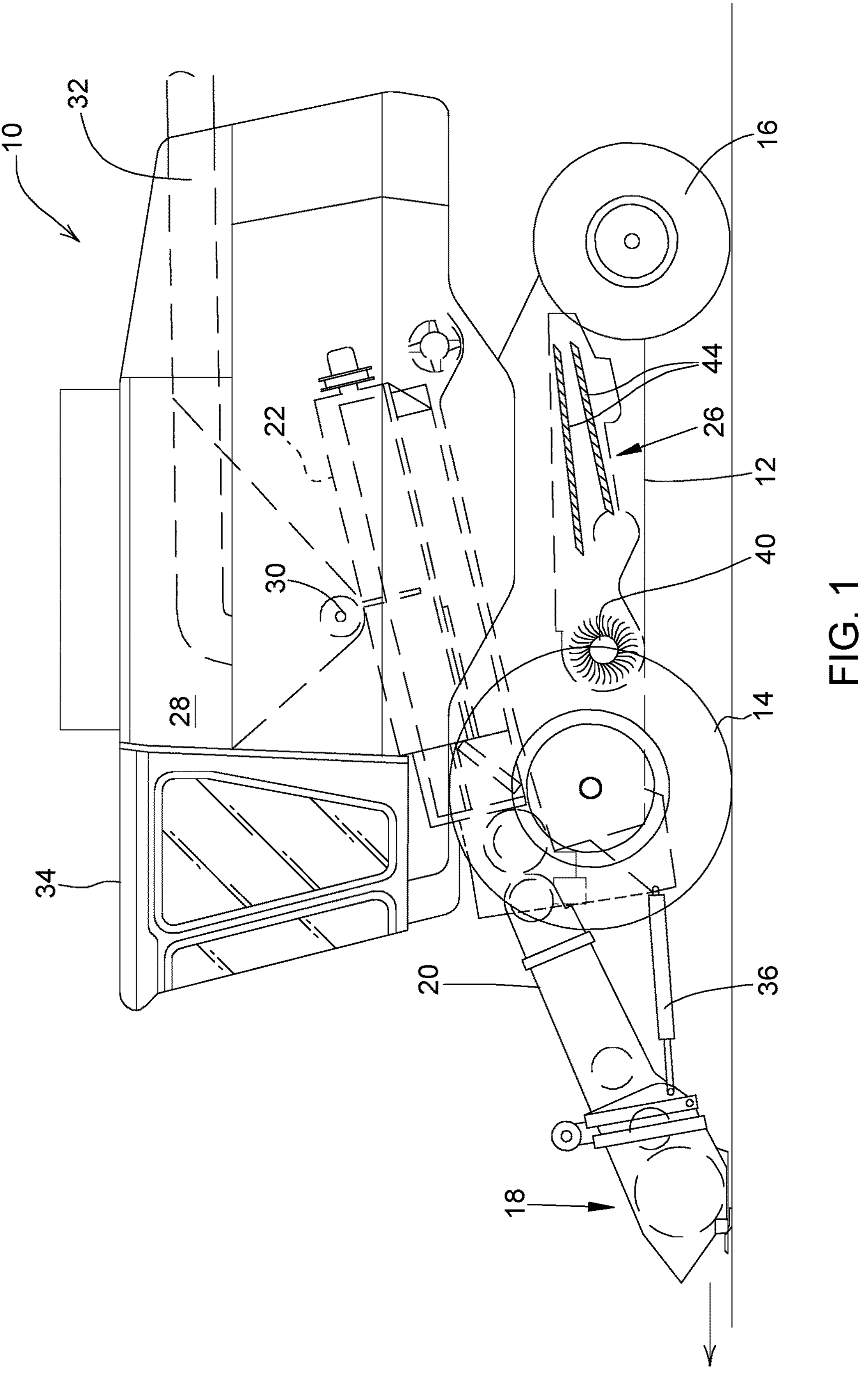

(51) Int. Cl.
*A01F 12/46* (2006.01)
*G01B 7/06* (2006.01)

(52) U.S. Cl.
CPC .......... *A01F 12/46* (2013.01); *A01D 41/1271* (2013.01); *A01F 12/44* (2013.01); *G01B 7/08* (2013.01); *G01B 7/10* (2013.01)

(58) Field of Classification Search
CPC ............ A01D 41/1271; A01D 41/1274; A01D 41/1275; A01D 41/00; G01N 15/1031; G01N 2015/1024; A01F 12/44; A01F 12/56
USPC .......................................................... 324/695
See application file for complete search history.

(56) References Cited

U.S. PATENT DOCUMENTS 9,119,350 B2 * 9/2015 Stan ..................... A01D 75/282
2005/0282601 A1 * 12/2005 Duquesne ............. A01F 12/448 460/101
2006/0229119 A1 * 10/2006 Wamhof .............. A01D 75/282 460/101
2007/0233416 A1 * 10/2007 Jeppe ................. A01D 41/1273 702/187
2015/0080069 A1 * 3/2015 Fuchs ................ A01D 41/1272 460/1
2016/0029562 A1 * 2/2016 De Smet ................ A01F 12/32 460/1
2016/0366821 A1 * 12/2016 Good ................ A01D 41/1271
2017/0150680 A1 * 6/2017 Moutton ............... G01F 23/263
2017/0231156 A1 * 8/2017 Aesaert ................ A01F 12/444 460/5
2020/0305352 A1 * 10/2020 Bussmann ......... A01D 41/1243
2022/0071088 A1 * 3/2022 Hermann .............. A01F 12/448
2023/0247940 A1 * 8/2023 Hermann .............. A01F 12/444 56/10.2 R

FOREIGN PATENT DOCUMENTS

DE 2903910 A1 8/1979
EP 0728409 A1 8/1996
EP 2537404 A1 12/2012
EP 3148312 A1 4/2017
EP 3482624 A1 5/2019
EP 3498078 A1 6/2019
EP 3556201 A1 10/2019
JP 3932655 B2 * 6/2007
WO WO-2016040960 A1 * 3/2016 ............. H04N 23/56
WO 2020126211 A1 6/2020
WO 2022090826 A1 5/2022
WO WO-2022124173 A1 * 6/2022 ............. A01F 12/46

* cited by examiner

SENSOR ARRANGEMENT FOR A COMBINE HARVESTER

RELATED APPLICATION

This application claims priority to DE 10 2022 116 228.1, filed Jun. 29, 2022, which is hereby incorporated by reference herein in its entirety.

FIELD OF THE DISCLOSURE

The present disclosure relates to a combine harvester and more particularly to a sensor arrangement for a combine harvester.

BACKGROUND

Combine harvesters serve to harvest grain. The parts of plants, such as soy, wheat or oats, which are above the ground are cut off or picked up or stripped off, or the fruits of the plants, such as corn or sunflowers, are separated off and fed to a threshing and separating device in order to separate the grain from the remaining constituent parts of the crop. After the threshing and separating operation, there are still contaminants in the grain, such as particles of straw and chaff. The mixture of grain and contaminants obtained during the threshing and separation is therefore fed to a cleaning system, which typically includes an upper screen and a lower screen and optionally a preliminary screen.

The screens are conventionally suspended on front and rear hangers and moved by means of an eccentric drive. In this way, the screens are set into an oscillating reciprocating movement, in which they move forward and rearward and upward and downward on elliptical or circular paths. In addition, they are acted upon from below with an air flow by a fan. The effect thus achieved is that the mixture is periodically thrown upward on the screen (at the upper reversal point of the path) and, after completing a parabolic trajectory, lands again on the screen. By means of the air flow and the impact on the screen after the throwing, heavier grain is separated from the lighter contaminants. Other conveying devices in the combine harvester are also implemented as vibratory pan conveyors, e.g. in order to convey the threshed crop from a threshing device or the separated crop from a separating device to the cleaning system, although multi-screw conveyors are also used for one or more of these tasks.

There are a multiplicity of known ways for automatically adjusting working parameters of the cleaning system, in particular the degree of opening of the screen louvers and the rotational speed of the fan. It is optionally possible for parameters, such as the amplitude and frequency of the vibration of the screens in the longitudinal direction and optionally in the lateral direction, positions of conveying or guiding elements for laterally evening out the screen loading, etc., to furthermore be changed. In order to be able to adjust these working parameters, detection of the distribution of the mixture of grain and contaminant on the screen or the conveying devices is useful. For this purpose, use is made of sensors which are attached rigidly to the screen or in the cleaning system where they detect physical parameters, such as temperatures (which depend on the respective air flow which, in turn, is a measure of the amount of the mixture), optical properties (light barriers) or electrical properties (capacity and the like). Conventionally, a row of sensors is distributed over the length and width of the screen in order to detect the distribution of the mixture. To this end, reference is made by way of example to DE 29 03 910 A1, EP 0 728 409 A1 and EP 3 482 624 A1. In other words, a measurement is undertaken by a two-dimensionally arranged grid of sensors.

It has furthermore been proposed also to measure the height of the mixture on the screen and the vertical distribution thereof in the grain and contaminants by attaching a row of sensors for detecting electrical properties of the mixture in a stack one above another and distributing said stacks over the length and/or width of the screen (EP 3 148 312 A1). Similarly, optical sensors have also been proposed which are attached to a screen or to a feed base (WO 2020/126211 A1 and WO 2022/090826 A1). Measurement of the vertical distribution of the grain is therefore undertaken here.

It is also known to attach, for investigation purposes, a sensor of the cleaning draft to a telescopic holder and to position the sensor manually at different positions in the cleaning system (CN 110637591 A). In addition, U.S. Pat. No. 4,266,878 A discloses a sensor of soil properties, which can be inserted at different depths in the soil.

It is apparent that the accuracy of the database for automatically regulating working parameters of a cleaning system depends on the number of sensors which investigate the mixture of grain and contaminants in the cleaning system. However, increasing the number of sensors increases the costs and also the probability of errors occurring.

SUMMARY

According to the present disclosure as shown in the attached drawings, a sensor arrangement for detecting properties of a mixture including grain and contaminants in a cleaning device of a combine harvester in one implementation or more implementations includes being provided with a sensor element for providing an output signal in respect of a property, detected by the sensor element, of the mixture adjacent to the sensor element. The sensor element in some implementations is arranged operationally (i.e. during the harvesting mode by means of driven devices, not manually, and not caused by a normal (conveying) movement of the mixture) continuously in succession in different positions in relation to the mixture in order to use the sensor element to investigate different points of the mixture in the different positions of the sensor element.

In this way, a single sensor element in some implementations investigate different points of the mixture. According to the present disclosure, a plurality of sensor elements are not required, and a good data basis for automated adjustment of the cleaning device is allowed. In addition, based on lateral distribution of the crop detected by the sensor element, adjustable closure flaps or the like of a threshing and/or separating device can be activated (cf. EP 2 537 404 A1). Conveying or guiding devices which are arranged between the threshing and/or separating device can be activated for evening the lateral distribution of the crop.

The sensor element in some implementations includes being brought into different positions along the flow direction of the mixture and/or along the vertical extent of the mixture. Alternatively or additionally, a movement of the sensor element in a horizontal direction oriented transversely with respect to the flow direction of the mixture would also be possible.

In one possible implementation, the different positionings of the sensor element in relation to the mixture includes being brought about by an active drive moving the sensor element in relation to the mixture.

In another implementation, the different positionings of the sensor element in relation to the mixture includes being achieved by a movement of an oscillatingly driven element of the cleaning device, e.g. a screen or a conveyor floor, on which the mixture is conveyed and/or processed, or a rotating element of the cleaning device, e.g. a rotating drive which serves to produce said oscillating movement or a rotational movement of a conveyor.

For this purpose, the sensor element includes being coupled in a freely movable manner to the element and, by means of the oscillating movement of the element, includes being set into movement in relation to the element, and therefore in relation to the mixture, owing to inertia.

As an alternative thereto, the sensor element includes being mechanically coupled to the element and to a fixed component (i.e. directly or indirectly to the chassis, in relation to which the element is movable), and therefore the oscillating movement of the element includes being mechanically converted into a movement of the sensor element in relation to the element, and therefore in relation to the mixture.

The sensor element, in some implementations, interacts with the mixture on a screen or on a conveyor of the cleaning device.

The respective position of the sensor element includes being detected by an associated position sensor which detects the position of the sensor element in relation to the mixture on the basis of the movement of a drive train for producing the relative movement. The position of the sensor element includes being determined on the basis of the signal thereof.

The sensor arrangement includes being connected to a driver assistance system which includes being configured for automatically activating operating parameters of the cleaning device and/or of a threshing and/or separating device and/or of a guiding device for crop on the basis of the signals of the sensor arrangement.

In one implementation, there is provided a sensor arrangement for detecting properties of a mixture including grain and contaminants in a cleaning device of a combine harvester. The sensor arrangement includes a sensor element for detecting a property of the mixture adjacent the sensor element. The sensor element provides an output signal based on the property, wherein the sensor element is configured to be brought operationally continuously in succession into different positions in relation to the mixture in order to sense different points of the mixture in the different positions of the sensor element.

In some implementations, the sensor element includes wherein the mixture has a flow direction and a vertical extent, and the sensor element is configured to be brought into different positions along the flow direction of the mixture.

In some implementations, the sensor element includes wherein the mixture has a flow direction and a vertical extent, and the sensor element is configured to be brought into different positions along the vertical extent of the mixture.

In some implementations, the sensor element includes wherein the different positionings of the sensor element in relation to the mixture are configured to be brought about by an active drive moving the sensor element in relation to the mixture.

In some implementations, the sensor element includes wherein the different positionings of the sensor element in relation to the mixture are configured to be achieved by a movement of a driven element of the cleaning device on which the mixture is processed.

In some implementations, the sensor element includes wherein the sensor element is coupled in a freely movable manner to the element and, by means of the oscillating movement of the element, and configured to be set into movement in relation to the element, and therefore in relation to the mixture, owing to inertia.

In some implementations, the sensor element includes wherein the sensor element is mechanically coupled to the element and to a chassis, and the oscillating movement of the element is configured to be mechanically converted into a movement of the sensor element in relation to the element, and in relation to the mixture.

In some implementations, the sensor element includes wherein the sensor element interacts with the mixture on a screen of the cleaning device.

In some implementations, the sensor element includes wherein the sensor element interacts with the mixture on a conveyor of the cleaning device.

In some implementations, the sensor element includes wherein the respective position of the sensor element is configured to be detected by an associated position sensor which detects the position of the sensor element in relation to the mixture.

In some implementations, the sensor element includes wherein the output signal of the sensor arrangement is configured to be used to adjust the operation of the combine harvester.

In another implementation, there is provided a cleaning device of a combine harvester. The combine harvester includes a sensor arrangement for detecting properties of a mixture including grain and contaminants in the cleaning device. The sensor arrangement further includes a sensor element for detecting a property of the mixture adjacent the sensor element wherein the sensor element provides an output signal based on the property. The sensor element is configured to be brought operationally continuously in succession into different positions in relation to the mixture in order to sense different points of the mixture in the different positions of the sensor element.

In some implementations, the cleaning device includes wherein the mixture includes a flow direction and a vertical extent, and the sensor element is configured to be brought into different positions along the flow direction of the mixture.

In some implementations, the cleaning device includes wherein the mixture has a flow direction and a vertical extent, and the sensor element is configured to be brought into different positions along the vertical extent of the mixture.

In some implementations, the cleaning device includes wherein the different positionings of the sensor element in relation to the mixture are configured to be brought about by an active drive moving the sensor element in relation to the mixture.

In some implementations, the cleaning device includes wherein the different positionings of the sensor element in relation to the mixture are configured to be achieved by a movement of a driven element of the cleaning device on which the mixture is processed.

In some implementations, the cleaning device includes wherein the sensor element is coupled in a freely movable manner to the element and, by means of the oscillating movement of the element, and is configure to be set into movement in relation to the element, and therefore in relation to the mixture, owing to inertia.

In some implementations, the cleaning device includes wherein the sensor element is mechanically coupled to the element and to a chassis, and the oscillating movement of the element is configured to be mechanically converted into a movement of the sensor element in relation to the element, and in relation to the mixture.

In some implementations, the cleaning device includes wherein the sensor element interacts with the mixture on a screen of the cleaning device.

In some implementations, the cleaning device includes wherein the sensor element interacts with the mixture on a conveyor of the cleaning device.

BRIEF DESCRIPTION

Figure 2:
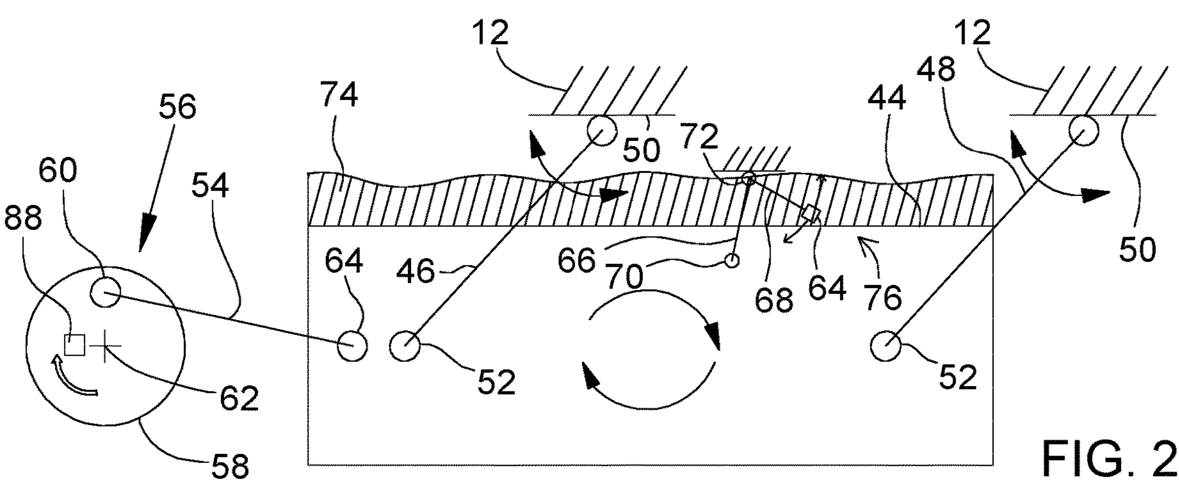
Figure 3:
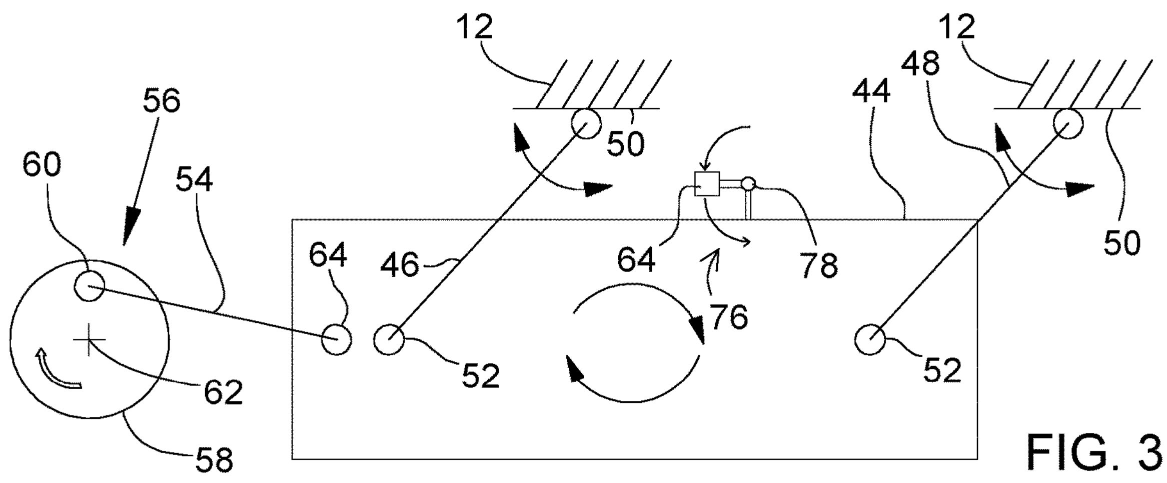
Figure 4:
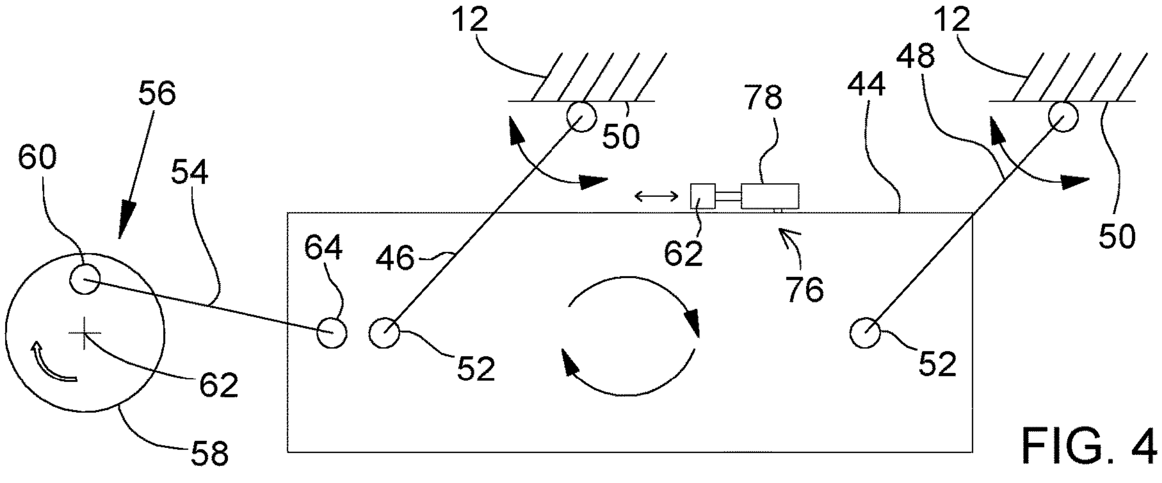
Figure 5:
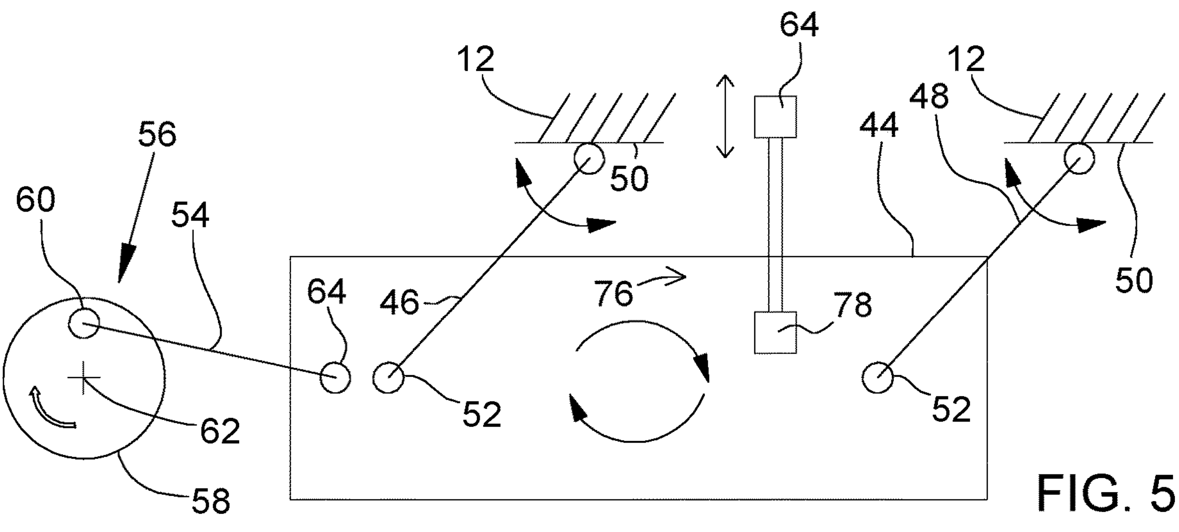
Figure 6:
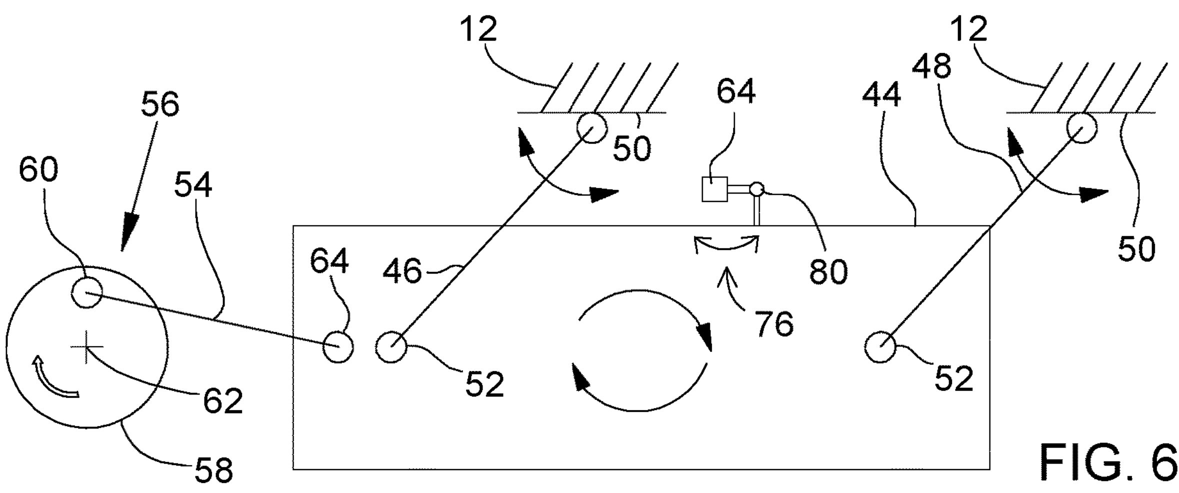
Figure 7:
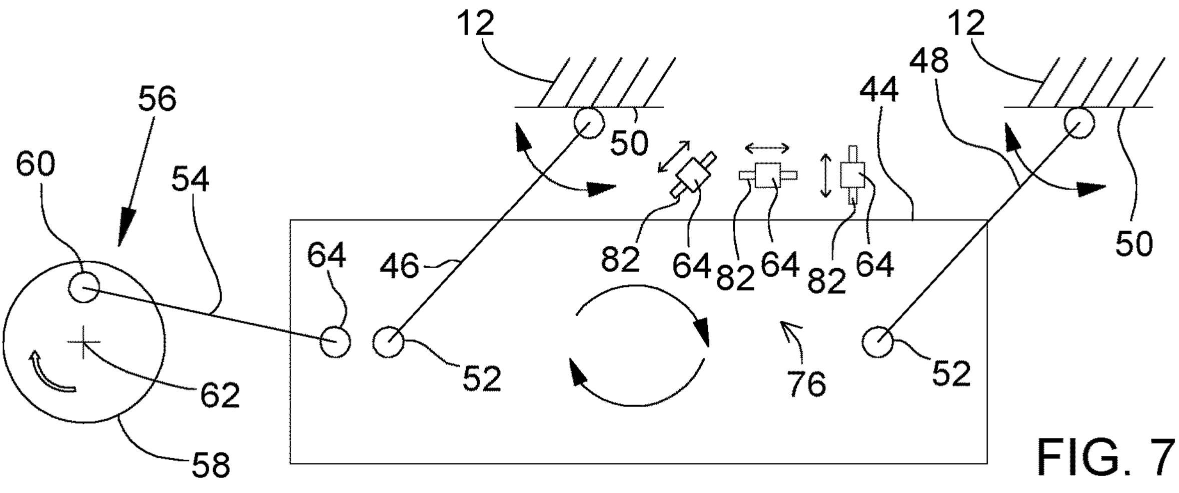
Figure 8:
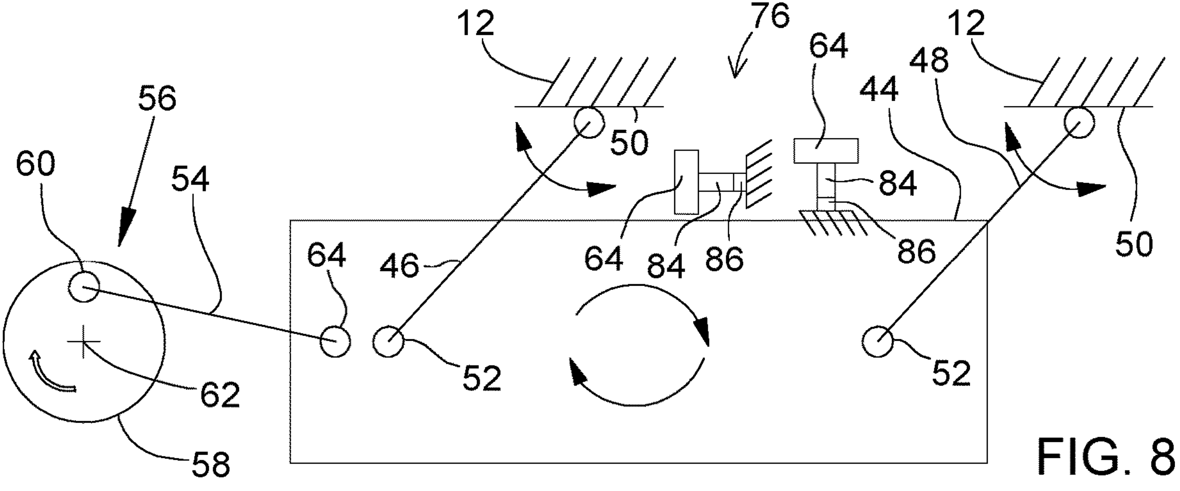

The above-mentioned aspects of the present disclosure and the manner of obtaining them will become more apparent and the disclosure itself will be better understood by reference to the following description of the implementations of the disclosure, taken in conjunction with the accompanying drawings, wherein:

FIG. 1 shows a schematic side view of a combine harvester,

FIG. 2 shows a schematic side view of a screen of the cleaning of the combine harvester with a first implementation of a sensor for detecting the mixture on the screen, FIG. 3 shows a schematic side view of a screen of the cleaning of the combine harvester with a second implementation of a sensor for detecting the mixture on the screen, FIG. 4 shows a schematic side view of a screen of the cleaning of the combine harvester with a third implementation of a sensor for detecting the mixture on the screen, FIG. 5 shows a schematic side view of a screen of the cleaning of the combine harvester with a fourth implementation of a sensor for detecting the mixture on the screen, FIG. 6 shows a schematic side view of a screen of the cleaning of the combine harvester with a fifth implementation of a sensor for detecting the mixture on the screen, FIG. 7 shows a schematic side view of a screen of the cleaning of the combine harvester with a sixth implementation of a sensor for detecting the mixture on the screen, and FIG. 8 shows a schematic side view of a screen of the cleaning of the combine harvester with a seventh implementation of a sensor for detecting the mixture on the screen.

DETAILED DESCRIPTION

FIG. 1 shows a self-propelled harvesting machine in the form of a combine harvester 10 with a chassis 12 which is supported on the ground via driven front wheels 14 and steerable rear wheels 1. The wheels 14, 16 can be set into rotation by means of drive means, not shown, in order to move the combine harvester 10 over a field to be harvested. Directional details, such as front and rear, refer below to the direction of travel V of the combine harvester 10 in the harvesting mode, the direction of travel running to the left in FIG. 1.

A harvesting header 18 in the form of a cutting unit can be connected removably to the front end region of the combine harvester 10 in order, in the harvesting mode, to harvest crop in the form of cereal or other threshable cereals from the field and to feed the crop upward and rearward through a feeder house assembly 20 to an axial threshing unit 22. The mixture can pass through threshing concave and gratings in the axial threshing unit 22, and a mixture containing grains and contaminants can pass into a cleaning device 26. Cereal cleaned by the cleaning device 26 can be supplied by means of a grain screw to a grain elevator, which conveys said cereal into a grain tank 28. The cleaned cereal from the grain tank 28 can be discharged through a discharge system with a transverse screw 30 and a discharge conveyor 32. Said systems can be driven by means of a combustion engine and can be monitored and controlled by an operator from a driver's cab 34. The axial threshing unit 22 illustrated is merely an example and could be replaced by a tangential threshing unit with one or more threshing drums and optionally separating drums and a subsequent separator in the form of a straw walker or one or more separating rotors.

The cleaning device 26 can include an upper screen 44 and a lower screen 44 which are acted upon by means of a fan 40 with an air flow flowing rearward and upward through the screens. The size of the screen openings (angle of rotation of the louvers of the screen 44) and the rotational speed of the fan 40 can be automatically changed by a driver assistance system 42 and suitable actuators.

FIG. 2 shows in more detail how the screens 44 can be suspended and driven. The screen 44 shown in FIG. 2 can be the upper screen 44 or the lower screen 44 from FIG. 1. The screen 44 shown in FIG. 2 can be suspended on a front hanger 46 and a rear hanger 48 which can each be mounted at their upper ends so as to be freely pivotable about horizontal axes running transversely with respect to the forward direction of the combine harvester 10 on holders 50 coupled to the chassis 12. In addition, the hangers 46 may be mounted at their lower ends on a frame of the screen 44 so as to be freely pivotable about horizontal axes running transversely with respect to the forward direction of the combine harvester 10 by means of bearings 52. Similar hangers 46, 48, holders 50 and bearings 52 can also be provided on the other side of the combine harvester 10 that is not shown in FIG. 2. Furthermore, the screen 44 can be coupled via a crank rod 54 to an eccentric drive 56 which may be constructed from a drive wheel 58, which can be mounted rotatably centrally on a shaft 62 and can be set into rotation, with a pin 60 arranged eccentrically with respect to the axis 62. The crank rod 54 can be connected rotatably at one end to the pin 60 and can be coupled at the other end to the screen 44 by a bearing 64. The axis 62 and the axes of the pin 60 and of the bearing 64 are oriented horizontally and transversely with respect to the forward direction of the combine harvester 10. FIGS. 2 to 8 merely show the principle of the drive and of the attachment of the screens 44, which can differ in detail. The hangers 46, 48 and holders 50 could also be arranged below the screens 44, and the two screens 44 could be coupled to each other in terms of drive. See, for example, EP 3 498 078 A1 and EP 3 556 201 A1.

A sensor arrangement 76 can be provided for detecting properties of the mixture 74 located on the screen 44. The sensor arrangement 76 can include a sensor element 64 which is fastened to a first arm 68 which is attached rigidly at one end to a second arm 66. The first arm can be connected at its first end to the screen 44 via a rotatable connection 70 and at its second end to the chassis 12 via a rotatable connection 72. During operation, the sensor element 64 therefore can execute an oscillating movement upward and downward (and slightly forward and rearward) as indicated by the arrows. If the connections 70, 72 do not carry out a circular movement relative to each other, one or both of the connections 70, 72 can additionally be configured to be displaceable in the longitudinal direction of the second arm 66.

The sensor element 64 can detect, in any desired manner, one or more properties of the mixture 74 which is in each case adjacent to it and is located in a sensitive region (i.e. at a distance which may be some mm or cm). The sensor element 64 could thus be a sensor which detects the electrical conductivity of the mixture in its environment, whether by resistance measurement or capacitively. It can also be an optical sensor which radiates electromagnetic waves in any desired wavelength range and receives reflected waves. These measurements permit at least a determination of whether mixture is located at all in the environment of the sensor element 64, and, in developed implementations, whether the mixture is (more or less clean) grain or contaminants or a mixture of grain and contaminants.

By way of the illustrated movement, the sensor elements 64 can be brought in succession and operationally continuously into different (vertical) positions in relation to the mixture. The sensor element 64 interacts in the different positions with different points of the mixture and detects the properties thereof. In the implementation according to FIG. 2, the movement of the sensor element 64 can be produced by the existing movement of the screen 44, which is produced by the shaft 62 and the eccentric drive 56, in relation to the chassis 12, using the arms 66, 68.

The sensor element 64 can be connected to the driver assistance system 42 in a signal-transmitting manner. By means of a suitable position sensor 88 connected to the driver assistance system 42 in a signal-transmitting manner, the position of the screen 44 in relation to the chassis 12 can be detected, e.g. by detecting the respective angle of rotation of the hangers 46 or 48 or of the shaft 62, and from this the position of the sensor element 64 relative to the mixture 74 or to the surface of the screen 44 can be calculated such that the signals of the sensor element 64 can be assigned to their respective position in the mixture 74. On the basis of the signals of the sensor element 64, i.e. the information obtained therefrom about the height of the mixture 74 and optionally the height-dependent composition thereof, the driver assistance system 42 can carry out the above-mentioned activation of the size of the screen openings of the screen 44 and the rotational speed of the fan 40, and optionally on the basis of further parameters of the cleaning device 26, e.g. lateral oscillation of the screens 44 or on the basis of active or passive elements (guiding plates, screw conveyors, etc.) for improving the lateral distribution of the mixture, which elements can be arranged in particular between the threshing and/or separating section of the axial threshing unit 22 and the cleaning device 26. In addition, closable flaps of the axial threshing unit can be monitored on the basis thereof.

A plurality of sensor arrangements 76 can be distributed over the length and/or width of the screen 44. For further details in this regard and for evaluating the signals and monitoring the working parameters of the cleaning device, reference may be had to DE 29 03 910 A1, EP 0 728 409 A1, EP 3 482 624 A1, EP 3 148 312 A1, WO 2020/126211 A1 and WO 2022/090826 A1, the disclosures of which are incorporated by reference into the present documents.

The relative movement between mixture 74 and sensor element 64 (which movement is not only the movement by means of the conventional conveying operation which the mixture on the screen 44 undergoes by means of the oscillating movement thereof, but also a movement superimposed on said conveying operation) can be senses by a single sensor element 64 at different points of the mixture 74 (here: in the vertical direction, i.e. transversely with respect to the longitudinal direction of the screen 44 and therefore to the conveying direction of the mixture 74 over the screen 44). This reduces the number of required sensor elements 64 useful for automatically adjusting operating parameters of the cleaning device 26.

In the implementations according to FIGS. 3 to 5, an active drive 78 can be provided which is supported on the screen 44 and which sets the sensor element 64 into rotation about a horizontal axis oriented transversely with respect to the longitudinal direction of the screen 44 (FIG. 3), or sets it into a linear reciprocating movement along the longitudinal direction of the screen 44 (FIG. 4) or sets it into a linear, vertical movement upward and downward (FIG. 5). Furthermore, the manner of operation corresponds to that of the implementation of FIG. 2, but wherein by means of the position sensor 88 (not shown in FIGS. 3 to 8), instead of detection of the position of the screen 44, the position of the sensor element 64 in relation to its suspension or fastening, or the respective desired or actual position of the starting element of the drive 78, or another suitable position of a movable element of the drive 78, is detected and supplied to the driver assistance system 42 so that the latter can assign the respective position to the signals of the sensor element 64.

The drive 78 can be supported on the screen 44 and can move together with the screen 44, as shown in FIGS. 3 to 5. It would also be conceivable to support the drive 78 on the chassis 12. Since, in this case, by means of the movement of the screen 44 in relation to the chassis 12, the sensor element 64 could also move in relation to the sensor element 64, it would then be useful to take into consideration the current position of the screen 44 in relation to the chassis 12 when calculating the position of the sensor element 64 in relation to the mixture 74 or the surface of the screen 44. It could also be possible to entirely dispense with the drive 78 and to attach the sensor element 64 rigidly to the chassis 12. The relative movement between screen 44 and sensor element 64 would then be provided only by means of the oscillating movement of the screen 44, which would at least permit a measurement of the mixture 74 at different positions in the longitudinal direction of the screen 44 and to a smaller extent in the vertical direction.

In the implementations according to FIGS. 6 to 8, the oscillating movement of the screen 44 can be used to produce the movement of the sensor element 64 in relation to the screen 44. In the implementation according to FIG. 6, the sensor element 64 can be fastened to a rotary bearing 80 which is supported on the screen 44 and may permit a free rotation of the sensor element 64 about a horizontal axis extending transversely with respect to the longitudinal direction of the screen 44. By contrast, in the implementation according to FIG. 7, the sensor element 64 can be fastened to a guide 82 which is supported on the screen 44 to permit a free, sliding movement of the sensor element 64 in relation to the guide 82 in the longitudinal direction thereof. Said guide can be oriented obliquely (shown on the left), horizontally (shown in the center) or vertically (shown on the right). The oscillating movement of the screen 44 has the effect that the sensor element 64 moves continuously along the guide 82.

In the implementation according to FIG. 8, the sensor element 64 can be attached by an inherently flexible element 84, e.g. made from rubber, to a holder 86, which can be coupled to the screen 44 or to the chassis 12, which permits a movement (bending) of the flexible element 84 in its main plane (which corresponds to the plane of the drawing of FIG. 8). The sensor element 64 could also be mounted pivotably about corresponding axes. As a result, the sensor element 64 can oscillate in the lateral direction, about a vertical axis (shown on the left) or about a horizontal axis (shown on the right).

In the implementations according to FIGS. 6 to 8, detection of the position of the sensor element 64 in relation to its suspension by a suitable position sensor (not shown) can also be useful in order to indicate to the driver assistance system 42 the point at which within the mixture 74 the measurement has taken place. The manner of operation corresponds to that according to the implementations of FIGS. 3 to 5, but no active drives 78 are required since the oscillation of the screen 44 serves to produce the relative movement of the sensor element 64 in relation to the screen 44.

A plurality of sensor elements 64 could also be mechanically connected to one another in order to be able to simultaneously detect the properties of different points in the mixture 74. In addition, a position sensor could also be dispensed with and the position of the sensor element 64 derived from the output signal thereof. If the sensor element 64, for example, does not detect a mixture 74, it can be assumed that it is arranged in an upper position, while a detected, maximum density of the mixture 74 indicates a lower position. Proceeding therefrom, the signals located in between in terms of time and/or signaling can be assigned to the positions located in between. This procedure can also serve as a fallback option in the event of failure of the position sensor or can complement the latter.

Furthermore, the cleaning device 26 can include not only the screens 44, but optionally a preliminary screen and a number of different conveyors which, for example, convey crop rearward from the threshing region of the axial threshing unit 22 and forward from the separating region of the axial threshing unit 22 in order to feed it to the screens 44 or to feed tailings to an after-thresher or to the axial threshing unit 22. One of the sensor arrangements 76 described can also be assigned to the preliminary screen or to one or more of said conveyors. Insofar as a vibratory pan conveyor is concerned, the procedure can be analogous to FIGS. 3 to 8 and, if the conveyor does not oscillate, but rather is implemented, for example, as a conveyor belt or multi-screw conveyor, one of the implementations according to FIGS. 3 to 6 can be used.

The invention claimed is:

1. A sensor arrangement for detecting properties of a mixture including grain and contaminants in a cleaning device of a combine harvester, the sensor arrangement comprising:

a sensor element for detecting a property of the mixture adjacent the sensor element, the sensor element providing an output signal based on the property, wherein the sensor element interacts with the mixture on a conveying device, and wherein the sensor element is configured to be brought operationally continuously in succession into different positions in relation to the conveying device in order to sense different points of the mixture in the different positions of the sensor element, wherein the different positions of the sensor element in relation to the conveying device are achieved by a movement of a driven element of the cleaning device on which the mixture is processed, and wherein the sensor element is mechanically coupled to the driven element and to a chassis, and an oscillating movement of the driven element is mechanically converted into a movement of the sensor element in relation to the driven element, and in relation to the conveying device.

2. The sensor arrangement of claim 1, wherein the mixture has a flow direction and a vertical extent, and the sensor element is configured to be brought into different positions along the flow direction of the mixture.

3. The sensor arrangement of claim 1, wherein the mixture has a flow direction and a vertical extent, and the sensor element is configured to be brought into different positions along the vertical extent of the mixture.

4. The sensor arrangement of claim 1, wherein the different positions of the sensor element in relation to the mixture are configured to be brought about by an active drive moving the sensor element in relation to the mixture.

5. The sensor arrangement of claim 1, wherein the sensor element interacts with the mixture on a screen of the cleaning device.

6. The sensor arrangement of claim 1, wherein the sensor element interacts with the mixture on a conveyor of the cleaning device.

7. The sensor arrangement of claim 1, wherein a respective position of the sensor element is configured to be detected by an associated position sensor which detects the position of the sensor element in relation to the mixture.

8. The sensor arrangement of claim 1, wherein the output signal of the sensor arrangement is configured to be used to adjust the operation of the combine harvester.

9. A cleaning device of a combine harvester, comprising;

a sensor arrangement for detecting properties of a mixture including grain and contaminants in the cleaning device, the sensor arrangement further including:

a sensor element for detecting a property of the mixture adjacent the sensor element, the sensor element providing an output signal based on the property, wherein the sensor element interacts with the mixture on a conveying device, and wherein the sensor element is configured to be brought operationally continuously in succession into different positions in relation to the conveying device in order to sense different points of the mixture in the different positions of the sensor element wherein the different positions of the sensor element in relation to the conveying device are achieved by a movement of a driven element of the cleaning device on which the mixture is processed, and wherein the sensor element is mechanically coupled to the driven element and to a chassis, and an oscillating movement of the driven element is mechanically converted into a movement of the sensor element in relation to the driven element, and in relation to the conveying device.

10. The cleaning device of claim 9, wherein the mixture has a flow direction and a vertical extent, and the sensor element is configured to be brought into different positions along the flow direction of the mixture.

11. The cleaning device of claim 9, wherein the mixture has a flow direction and a vertical extent, and the sensor element is configured to be brought into different positions along the vertical extent of the mixture.

12. The cleaning device of claim 9, wherein the different positions of the sensor element in relation to the mixture are configured to be brought about by an active drive moving the sensor element in relation to the mixture.

13. The cleaning device of claim 9, wherein the sensor element interacts with the mixture on a screen of the cleaning device.

14. The cleaning device of claim 9, wherein the sensor element interacts with the mixture on a conveyor of the cleaning device.

* * * * *